United States Patent
Nishi et al.

(10) Patent No.: US 8,837,593 B2
(45) Date of Patent: *Sep. 16, 2014

(54) IMAGE PROCESSING APPARATUS, IMAGE PROCESSING METHOD, AND PROGRAM

(75) Inventors: Toru Nishi, Kanagawa (JP); Kazuhiko Ueda, Kanagawa (JP); Mitsuyasu Asano, Tokyo (JP)

(73) Assignee: Sony Corporation, Tokyo (JP)

( * ) Notice: Subject to any disclaimer, the term of this patent is extended or adjusted under 35 U.S.C. 154(b) by 320 days.

This patent is subject to a terminal disclaimer.

(21) Appl. No.: 13/465,591

(22) Filed: May 7, 2012

(65) Prior Publication Data

US 2012/0224099 A1    Sep. 6, 2012

Related U.S. Application Data

(63) Continuation of application No. 12/237,521, filed on Sep. 25, 2008, now Pat. No. 8,175,162.

(30) Foreign Application Priority Data

Oct. 4, 2007    (JP) ................ P2007-260840

(51) Int. Cl.
  *H04N 7/12*    (2006.01)
  *H04N 11/04*    (2006.01)
  *G06K 9/36*    (2006.01)

(52) U.S. Cl.
  USPC ............ 375/240.16; 375/240.18; 375/240.19; 375/240.2; 382/236; 382/237; 382/238

(58) Field of Classification Search
  USPC .................................... 375/240.16
  See application file for complete search history.

(56) References Cited

U.S. PATENT DOCUMENTS

2007/0263901 A1*  11/2007  Wu et al. ............... 382/104

FOREIGN PATENT DOCUMENTS

| JP | 11-112940 | 4/1999 |
| JP | 2000-134585 | 5/2000 |
| JP | 2006-66986 | 3/2006 |
| WO | WO 96/33571 | 10/1996 |
| WO | WO 03/055221 A2 | 7/2003 |
| WO | WO 2004/059605 A2 | 7/2004 |

OTHER PUBLICATIONS

S. Weitbruch, et al., "Bildqualitatsverbesserung durch Codierungsoptimierung fur Plasma-TV", FKT Fernseh Und Kinotechnik, Fachverlag Schiele & Schon GMBH., Berlin, DE, vol. 54, No. 8/09, XP001078093, pp. 520-524, (2000).

European Search Report from the European Patent Office in European Application No. 08253059.3, May 20, 2010.

* cited by examiner

*Primary Examiner* — Longbit Chai

(74) *Attorney, Agent, or Firm* — Finnegan, Henderson, Farabow, Garrett & Dunner, L.L.P.

(57) ABSTRACT

An image processing apparatus for processing an input moving image including a plurality of access units arranged every first period. The image processing apparatus includes a motion vector calculation unit which calculates a motion vector of an object included in the input moving image every second period, a motion vector conversion unit which converts the motion vector by multiplying the calculated motion vector by a predetermined gain, and a gain calculation unit which calculates the predetermined gain in accordance with a brightness in a user environment and supplies the predetermined gain to the motion vector conversion unit.

7 Claims, 12 Drawing Sheets

IMAGE PROCESSING APPARATUS, IMAGE PROCESSING METHOD, AND PROGRAM

CROSS REFERENCES TO RELATED APPLICATIONS

This is a continuation of U.S. patent application Ser. No. 12/237,521, filed Sep. 25, 2008, now U.S. Pat. No. 8,175,162, which claims the benefits of priority to Japanese Patent Application JP 2007-260840 filed in the Japanese Patent Office on Oct. 4, 2007, the entire contents of all of the above-mentioned applications are incorporated herein by reference.

BACKGROUND OF THE INVENTION

1. Field of the Invention

The present invention relates to image processing apparatuses, image processing methods, and programs, and more particularly relates to an image processing apparatus capable of appropriately displaying a movie source irrespective of change of brightness of an environment, an image processing method, and a program.

2. Description of the Related Art

In general, when a movie is shown at a movie theater, identical two frames (fields) are displayed in 48 Hz. Therefore, a frame arrangement period of image data included in a movie source corresponds to 24 Hz. That is, the image data included in the movie source has 24 frames.

On the other hand, a display period of general television broadcasting receivers corresponds to 60 Hz (120 Hz). Therefore, when image data of a movie source is displayed using a general television receiver, the image data having 24 frames is necessary to be converted into image data having 60 frames (120 frames).

Japanese Unexamined Patent Application Publication No. 2006-066986 discloses a 2-3 pull down technique as an example of a technique of converting image data having 24 frames into image data having 60 frames (120 frames). Furthermore, a technique of compensating for frames by calculating a motion vector of an object so that the object moves in accordance with the motion vector has been proposed (hereinafter referred to as a "motion-vector utilizing processing").

SUMMARY OF THE INVENTION

However, there arises a problem in that when a user views a movie source which has been subjected to 2-3 pull down processing using a television broadcasting receiver, for example, in a room environment in which a room is brighter than general movie theaters, a highly-visible judder is generated. On the other hand, when a user views a movie source which has been subjected to the motion vector utilizing processing using a television broadcasting receiver, for example, in a room environment in which a room is as dark as general movie theaters, there arises a problem in that the movie source is shown like a video image rather than being a movie, that is, realistic sensation which is one of characteristics of movies is deteriorated.

Accordingly, it is desirable to appropriately display a movie source irrespective of change of brightness of an environment.

According to an embodiment of the present invention, there is provided an image processing apparatus which performs processing on an input moving image including a plurality of access units arranged every first period. The image processing apparatus includes motion vector calculation means for calculating a motion vector of an object included in the input moving image every second period, motion vector conversion means for converting the motion vector by multiplying the motion vector calculated using the motion vector calculation means by a predetermined gain, frame compensation means for generating an output moving image including a plurality of access units arranged every third period by performing frame compensation processing of converting or compensating for the access units on the input moving image so that the object moves in accordance with the motion vector which has been subjected to the conversion performed using the motion vector conversion means, and gain calculation means for calculating the gain in accordance with brightness in a user environment where a user views the output moving image and supplying the obtained gain to the motion vector conversion means.

The image processing apparatus may further include brightness detection means for detecting the brightness in the user environment. The gain calculation means calculates the gain in accordance with the brightness detected using the brightness detection means.

The image processing apparatus may further includes correction means for correcting the gain calculated using the gain calculation means in accordance with an instruction issued by the user.

An image processing method according to another embodiment of the present invention and a program according to a further embodiment of the present invention are associated with the image processing apparatus according to the embodiment of the present invention.

The image processing method according to the other embodiment of the present invention and the program according to the further embodiment of the present invention perform the following processing on an input moving image including a plurality of access units arranged every first period. A motion vector of an object included in the input moving image is calculated every second period, the motion vector is converted by multiplying the calculated motion vector by a predetermined gain, an output moving image including a plurality of access units arranged every third period is generated by performing frame compensation processing of converting or compensating for the access units on the input moving image so that the object moves in accordance with the motion vector which has been subjected to the conversion. Here, the gain is calculated in accordance with brightness in a user environment where a user views the output moving image.

Accordingly, image processing performed on a moving image of a movie source is realized. In particular, the movie source is appropriately displayed irrespective of change of brightness of an environment.

DESCRIPTION OF THE PREFERRED EMBODIMENTS

Figure 1:
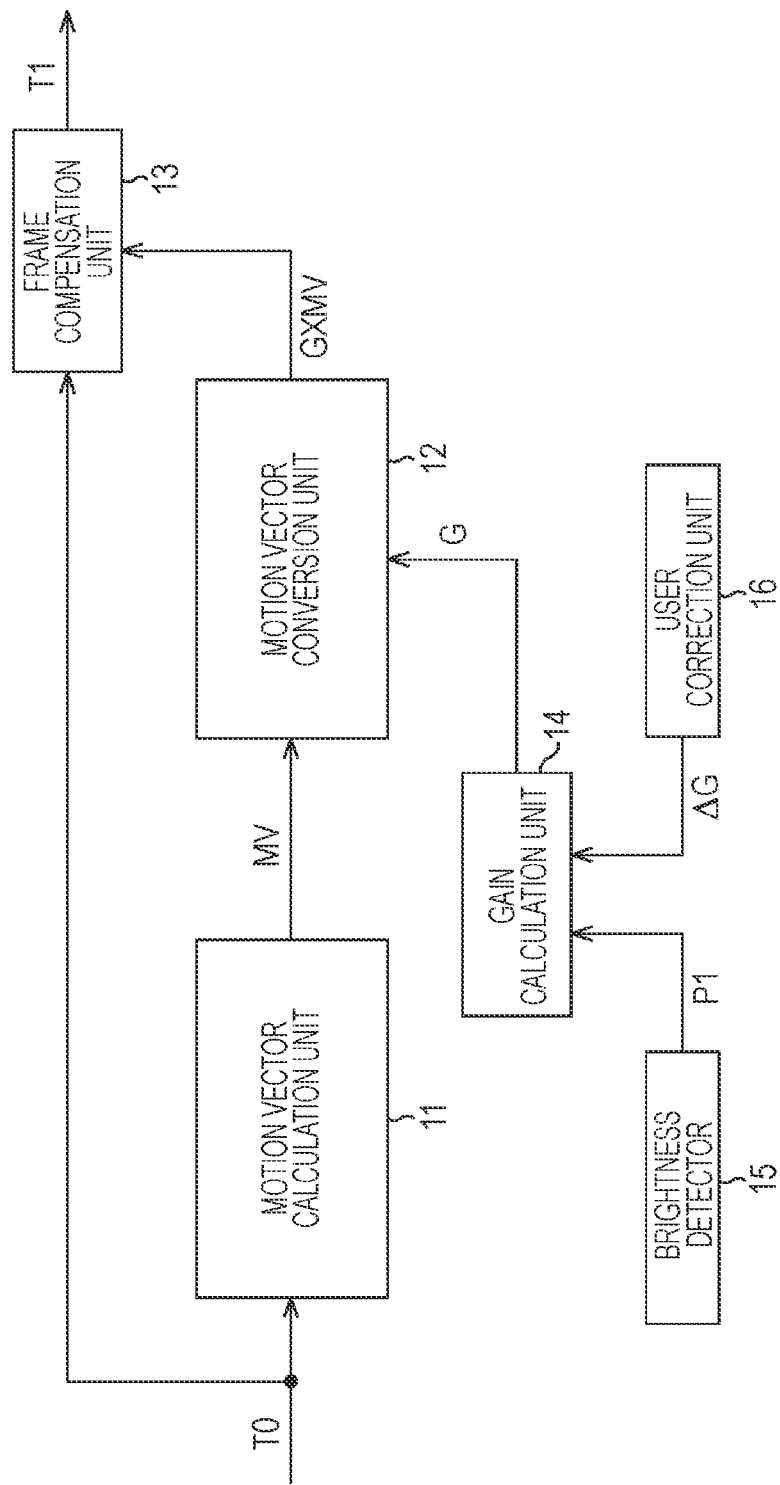
FIG. 1 is a block diagram illustrating an example of a functional configuration of an image processing apparatus according to an embodiment of the present invention.

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the embodiments of the invention are described in the claims. That is, the description does not deny the existence of embodiments of the present invention that are not claimed in the invention of this application, i.e., the existence of embodiments of the present invention that in future may be claimed by a divisional application, or that may be additionally claimed through amendments.

An image processing apparatus (an image processing apparatus shown in FIG. 1, for example) according to an embodiment of the present invention which performs processing on an input moving image (a film shown in a drawing on an upper side of FIG. 2 and a film which has been subjected to 2-3 pull down processing shown in a drawing on a lower side of FIG. 2, for example) including a plurality of access units arranged every first period. The image processing apparatus includes a motion vector calculation unit (a motion vector calculation unit 11 shown in FIG. 1, for example) configured to calculate a motion vector of an object included in the input moving image every second period, a motion vector conversion unit (a motion vector conversion unit 12 shown in FIG. 1, for example) configured to convert the motion vector by multiplying the motion vector calculated using the motion vector calculation unit by a predetermined gain, a frame compensation unit (a frame compensation unit 13 shown in FIG. 1, for example) configured to generate an output moving image including a plurality of access units arranged every third period by performing frame compensation processing of converting or compensating for the access units on the input moving image so that the object moves in accordance with the motion vector which has been subjected to the conversion performed using the motion vector conversion unit, and a gain calculation unit (a gain calculation unit 14 shown in FIG. 1, for example) configured to calculate the gain in accordance with brightness in a user environment where a user views the output moving image and supplying the obtained gain to the motion vector conversion unit.

The image processing apparatus further includes a brightness detection unit (a brightness detector 15 shown in FIG. 1, for example) configured to detect the brightness in the user environment. The gain calculation unit calculates the gain in accordance with the brightness detected using the brightness detection unit.

The image processing apparatus further includes a correction unit (a user correction unit 16 shown in FIG. 1, for example) configured to correct the gain calculated using the gain calculation unit in accordance with an instruction issued by the user.

An image processing method according to another embodiment of the present invention and a program according to a further embodiment of the present invention are associated with the image processing apparatus according to the embodiment of the present invention. Although the program will be described hereinafter in detail, the program is recorded in a removable medium 111 shown in FIG. 12 or a recording medium such as a hard disk included in a storage unit 108, and is executed by a computer having a configuration shown in FIG. 12.

According to a still further embodiment of the present invention, there is provided a recording medium which stores the program according to one of the embodiments of the present invention.

The image processing apparatus according to one of the embodiments of the present invention is usable as an entire television system or a component of the television system. The television system means a system including at least one AV (Audio and Visual) device including a television broadcasting receiver.

An embodiment of the present invention will now be described with reference to the accompanying drawings.

Note that the description described below has the following prerequisite.

Specifically, in various embodiments, which will be described hereinafter, various image processing operations are performed on moving images in an access unit. The "access unit" means a unit of a moving image such as a frame and a field, and specifically, means an entire (a frame, for example) or a part (a field, for example) of each of still images constituting the moving image. Note that the various image processing operations are performed on the moving image in a unit of a frame hereinafter for simplicity.

Furthermore, the moving image (video image) to be subjected to image processing is referred to as a signal or data hereinafter.

Moreover, signals supplied to functional blocks included in an image processing apparatus, which will be described with reference to FIG. 1 hereinafter, are equally referred to as input signals. That is, the signals supplied to the functional blocks are equally referred to as input signals irrespective of a unit of input such as a unit of a moving image, a unit of a frame included in the moving image, and a unit of a pixel (pixel value) constituting the frames. Similarly, signals output from the functional blocks are equally referred to as output signals irrespective of a unit of output. When the unit of input or the unit of output is necessary to be specified, however, the description is made using a specified unit (mainly, a unit of a frame), and otherwise, the description is made using an input signal or an output signal.

FIG. 1 is a block diagram illustrating an example of a functional configuration of an image processing apparatus according to an embodiment of the present invention.

The image processing apparatus shown in FIG. 1 includes a motion vector calculation unit 11, a motion vector conversion unit 12, a frame compensation unit 13, a gain calculation unit 14, a brightness detector 15, and a user correction unit 16.

In the image processing apparatus shown in FIG. 1, an input signal T0 representing a moving image having a frame period of 24 Hz, for example, is supplied to each of the motion vector calculation unit 11 and the frame compensation unit 13.

Note that a signal having a frame period of L Hz (L is an arbitrary integer value) is simply referred to as an "L-Hz signal" hereinafter.

The motion vector calculation unit 11 calculates a motion vector MV of the supplied input signal T0 every predetermined period, for example, a period of 24 Hz, and supplies the motion vector MV to the motion vector conversion unit 12.

Here, motion vectors MV are calculated for individual pixel values constituting a frame. Note that a certain object (represented by rectangular regions shown in FIG. 3, for example, which will be described hereinafter) included in the moving image represented by the input signal T0 is taken as an example in the description below for simplicity, and the motion vectors MV represent vectors indicating amounts of movement and directions of the movement of the certain object.

In other words, a processing operation performed on pixels included in the certain object is focused on hereinafter among processing operations performed on a frame. However, it is apparent that if a zero vector is included in the motion vectors, other pixels included in the frame are subjected to processing operations similar to the processing operation described below.

The motion vector conversion unit 12 converts a motion vector MV into a motion vector G×MV by multiplying the motion vector MV by a gain G calculated using the gain calculation unit 14. The obtained motion vector G×MV is supplied to the frame compensation unit 13.

The frame compensation unit 13 performs frame compensation processing on the input signal T0 and outputs a signal T1 as an output signal obtained as a result of the frame compensation processing. In the frame compensation processing, new frames are inserted between the frames included in the input signal T0 so that the input signal T0 having a number of frames (frame period) is converted into a signal having an increased number of frames. By this, the 24-Hz input signal T0 is converted into the 120-Hz output signal T1 in this embodiment.

Specifically, in this embodiment, the frame compensation unit 13 performs the following frame compensation processing, for example. As described above, the motion vector MV obtained through the calculation performed using the motion vector calculation unit 11 represents an amount of movement and a direction of the movement of the certain object included in the moving image for simplicity. Therefore, the frame compensation unit 13 performs the frame compensation processing of converting or compensating for the frames of the input signal T0 so that the certain object moves in accordance with the motion vector G×MV obtained through the conversion performed using the motion vector conversion unit 12. In this way, the 120-Hz output signal T1, that is, the output signal T1 including a plurality of frames arranged with a frame period of 120 Hz is generated.

The frame compensation processing of this embodiment will be described in detail hereinafter with reference to FIGS. 2 to 11.

The gain calculation unit 14 calculates the gain G in accordance with a brightness P1 detected using the brightness detector 15. Note that the relationship between the brightness P1 and the gain G will be described hereinafter with reference to FIG. 6.

The brightness detector 15 detects the brightness P1 in a user environment in which the user views a video image corresponding to the signal T1 output from the frame compensation unit 13, and supplies the brightness P1 to the gain calculation unit 14.

The user correction unit 16 supplies a gain correction amount ΔG obtained in accordance with an instruction operation of the user to the gain calculation unit 14. Specifically, the user freely compensates for the gain G using the image processing apparatus shown in FIG. 1.

Referring now to FIGS. 2 to 11, operation of the image processing apparatus shown in FIG. 1 will be described.

Figure 2:
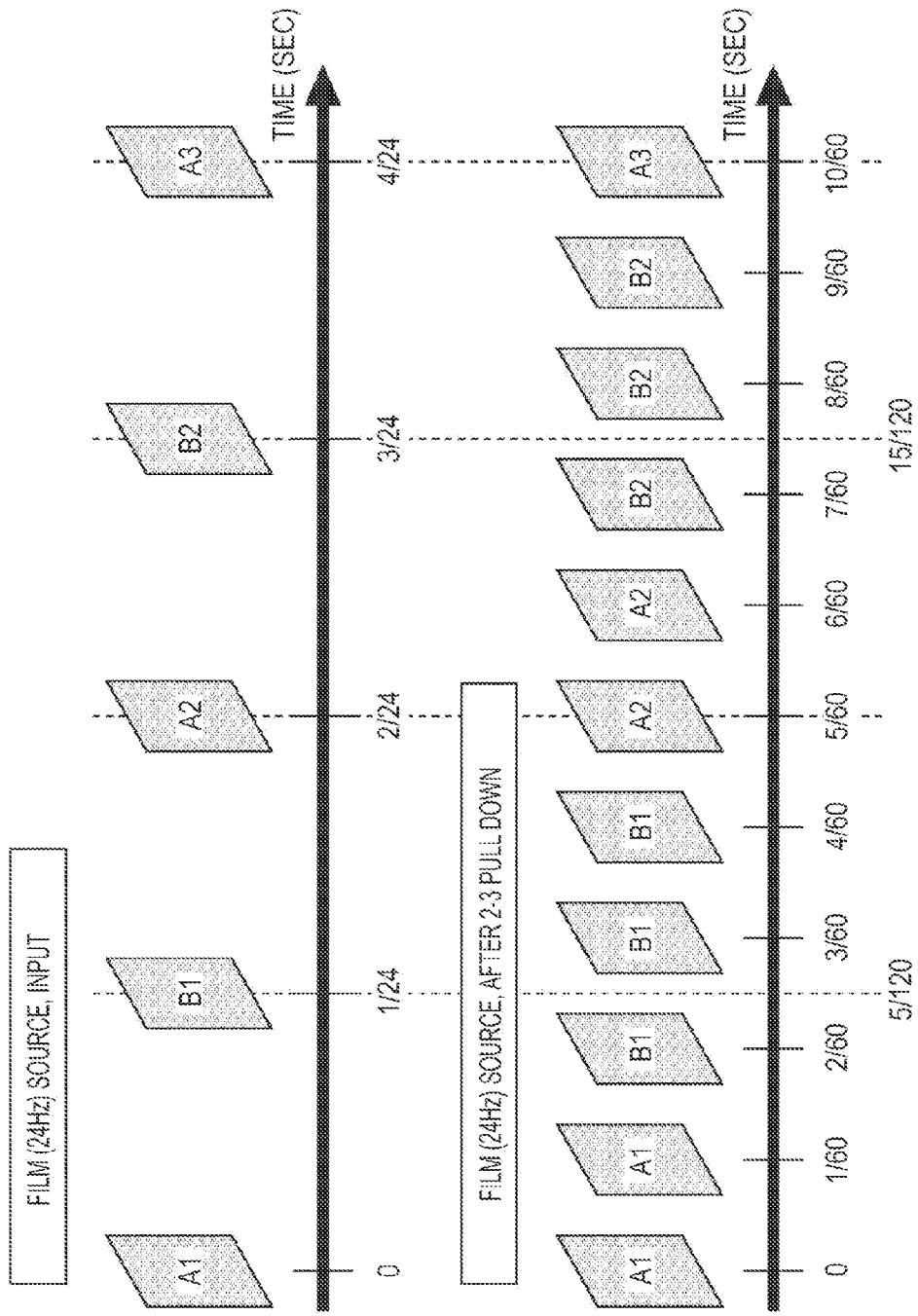
FIG. 2 is a timing chart illustrating an example of an input signal.

FIG. 2 shows a timing chart illustrating an example of the input signal T0. In FIG. 2, rectangular regions denoted by reference characters AK (K is an arbitrary integer value) and BK in the middle portions of the rectangular regions represent individual frames, and an axis of abscissa denotes time (time [sec]). Note that the frames described above will be referred to as frames AK and BK.

Specifically, a drawing on an upper side of FIG. 2 shows a timing chart in a case where image data having a frame period of 24 Hz, that is, image data (hereinafter referred to as a "film") representing a movie source including 24 frames is supplied as the input signal T0.

A drawing on a lower side of FIG. 2 shows a timing chart in a case where image data (hereinafter referred to as a film which has been subjected to the 2-3 pull down processing) obtained by converting the film by the 2-3 pull down processing is supplied as the input signal T0. Here, in the 2-3 pull down technique, the image data having a frame period of 24 Hz and having frames AK and BK alternately arranged is converted into image data having a frame period of 60 Hz by inserting new frames AK after the frames AK so that each of the frames AK is followed by one of the new frames AK which is identical to the corresponding one of the frames AK, and inserting new frames BK after the frames BK so that each of the frames BK is followed by two of the new frames BK.

That is, the film or the film which has been subjected to the 2-3 pull down processing is supplied as the input signal T0 in this embodiment.

An operation of the image processing apparatus shown in FIG. 1 in a case where the film is supplied as the input signal T0 will first be described. Thereafter, another operation of the image processing apparatus shown in FIG. 1 in a case where the film which has been subjected to the 2-3 pull down processing will be described.

Figure 3:
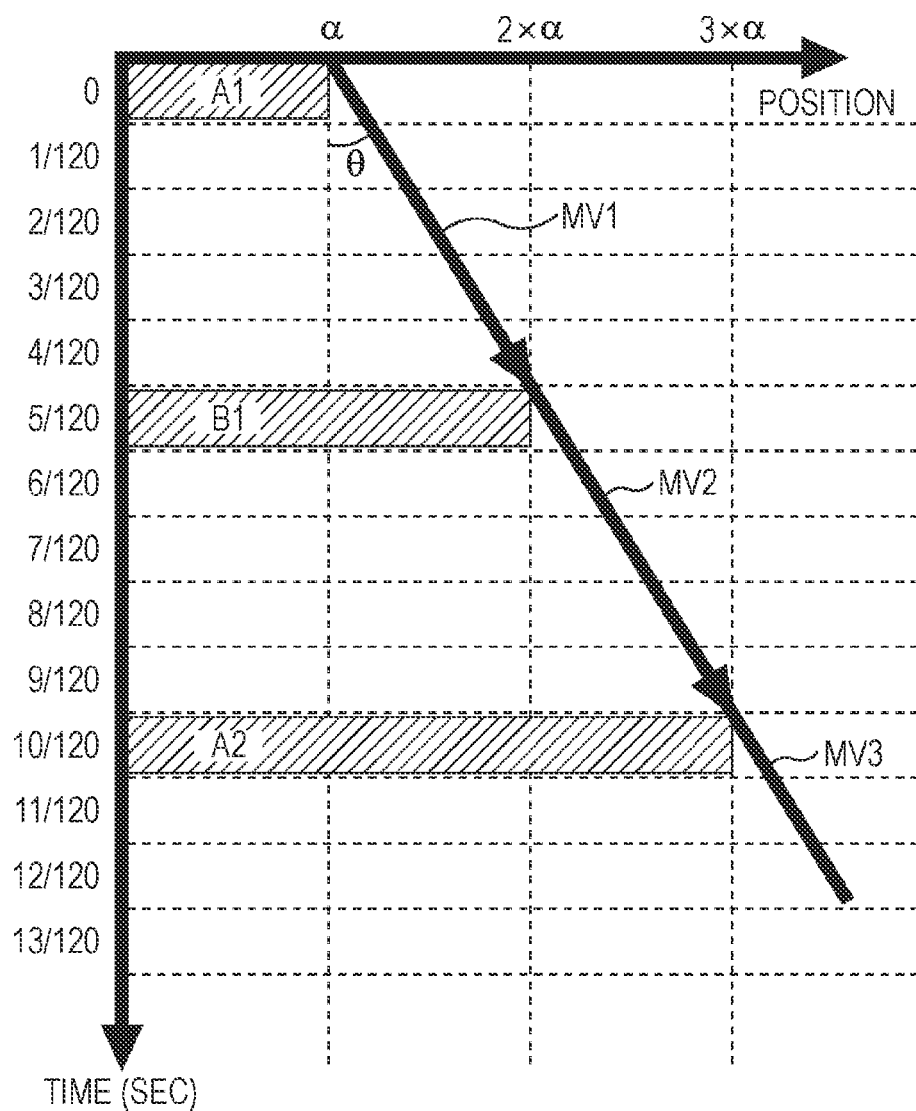
FIG. 3 is a timing chart illustrating a movement of an object in a film as an input signal.

As shown in FIG. 3, it is assumed that an object which is represented by rectangular regions in FIG. 3 and which is included in the film moves to the right by a [pix] every 5/120 [sec]. Specifically, in FIG. 3, rectangular regions A1, B1, and A2 represent an identical object included in frames A1, B1, and A2, respectively, which uniformly moves to the right with a speed of $\alpha$ [pix/(5/120)sec].

In other words, FIG. 3 is a timing chart illustrating a movement of the object. In FIG. 3, an axis of ordinate denotes time and an axis of abscissa denotes positions of the object included in the frames in a lateral direction. Reference characters MVP (P denotes an integer value or a dash) assigned to arrow marks represent motion vectors. However, the arrow marks do not represent actual motion vectors. Note that assuming that an angle defined by the arrow marks and a line extending downward in FIG. 3 is denoted by $\theta$, $\sin \theta$ relative to the arrow marks represents the actual motion vectors. Note that these definitions employed in FIG. 3 are similarly employed in FIGS. 4 and 5 and FIGS. 7 to 11, which will be described hereinafter.

As shown in FIGS. 2 and 3, the film represented by the input signal T0 corresponds to image data having a frame period of 24 Hz. In addition, a unit of processing of the motion vector calculation unit 11 is a frame period of 24 Hz in this embodiment as described above. Therefore, the motion vector calculation unit 11 calculates motion vectors MV for individual frames which constitute the film. That is, in the example shown in FIG. 3, motion vectors MV1, MV2, and MV3 for the frames A1, B1, and A2, respectively, of the object are obtained. Here, each of the motion vectors MV1, MV2, and MV3 has a movement direction to the right and an amount of a movement of $\alpha$[pix/(5/120)sec].

In order to generate a 120-Hz output signal T1 by performing the frame compensation processing on the 24-Hz input signal T0, four frames which are arranged with even time intervals should be inserted between each of a pair of the frames A1 and B1 and a pair of the frames B1 and A2.

Figure 4:
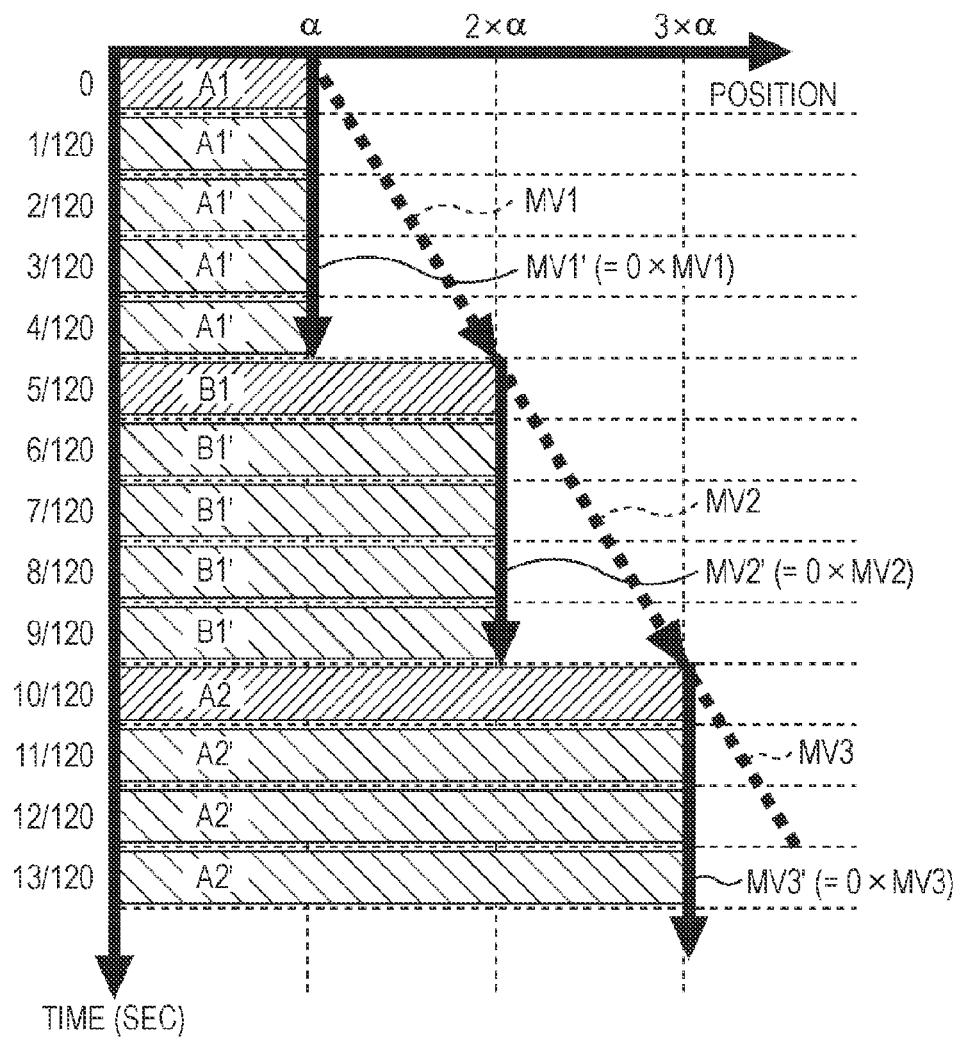
FIG. 4 is a timing chart illustrating a movement of the object relative to an output signal obtained after the image processing apparatus shown in FIG. 1 performs frame compensation processing on the input signal shown in FIG. 3 in a case where all motion vectors obtained after conversion processing become 0 when a room turns dark, for example.

As shown in FIG. 4, for example, four frames A1', four frames B1', and four frames A2' may be inserted after the frames A1, B1, and A2, respectively, by performing processing similar to the 2-3 pull down processing so that the 120-Hz output signal T1 is generated.

In this case, when the frame A1 and the four frames A1' are displayed, an edge portion of the object (represented by the rectangular regions shown in FIG. 4) do not move from a position represented by $\alpha$. A position of the edge portion of the object which corresponds to M (M is an arbitrary integer value) is simply referred to as an "M position" hereinafter.

When the frame B1 is displayed, the edge portion of the object drastically moves to a $2\times\alpha$ position, and while the four frames B1' are displayed, the edge portion of the object does not move from the $2\times\alpha$ position. Furthermore, when the frame A2 is displayed, the edge portion of the object drastically moves to a $3\times\alpha$ position, and while the four frames A2' are displayed, the edge portion of the object does not move from the $3\times\alpha$ position.

As described above, the object does not move during a period of 5/120 (=1/24) [sec], and thereafter, when a next period of 5/120 (=1/24) [sec] has passed, the object drastically moves to the right by $\alpha$. That is, a highly-visible judder is generated.

In particular, when brightness in the user environment (for example, brightness in a room or brightness of a screen) is higher than predetermined brightness, that is, when the user environment is brighter than general movie theaters, a highly-visible judder is generated. This is because human eyes have such a characteristic that although the human eyes are capable of following a moving object, accuracy of this capability changes in accordance with brightness. Specifically, the human eyes have such a characteristic that as the user environment is brighter, the human eyes follow the object moving at higher speed. In other words, this capability corresponds to eye sensibility, and the human eyes have such a characteristic that assuming that as the eye sensibility is higher, the human eyes follow an object moving at higher speed, the eye sensibility and the brightness has a constant relationship. Such a characteristic is referred to as an "eye-following characteristic" hereinafter.

Figure 5:
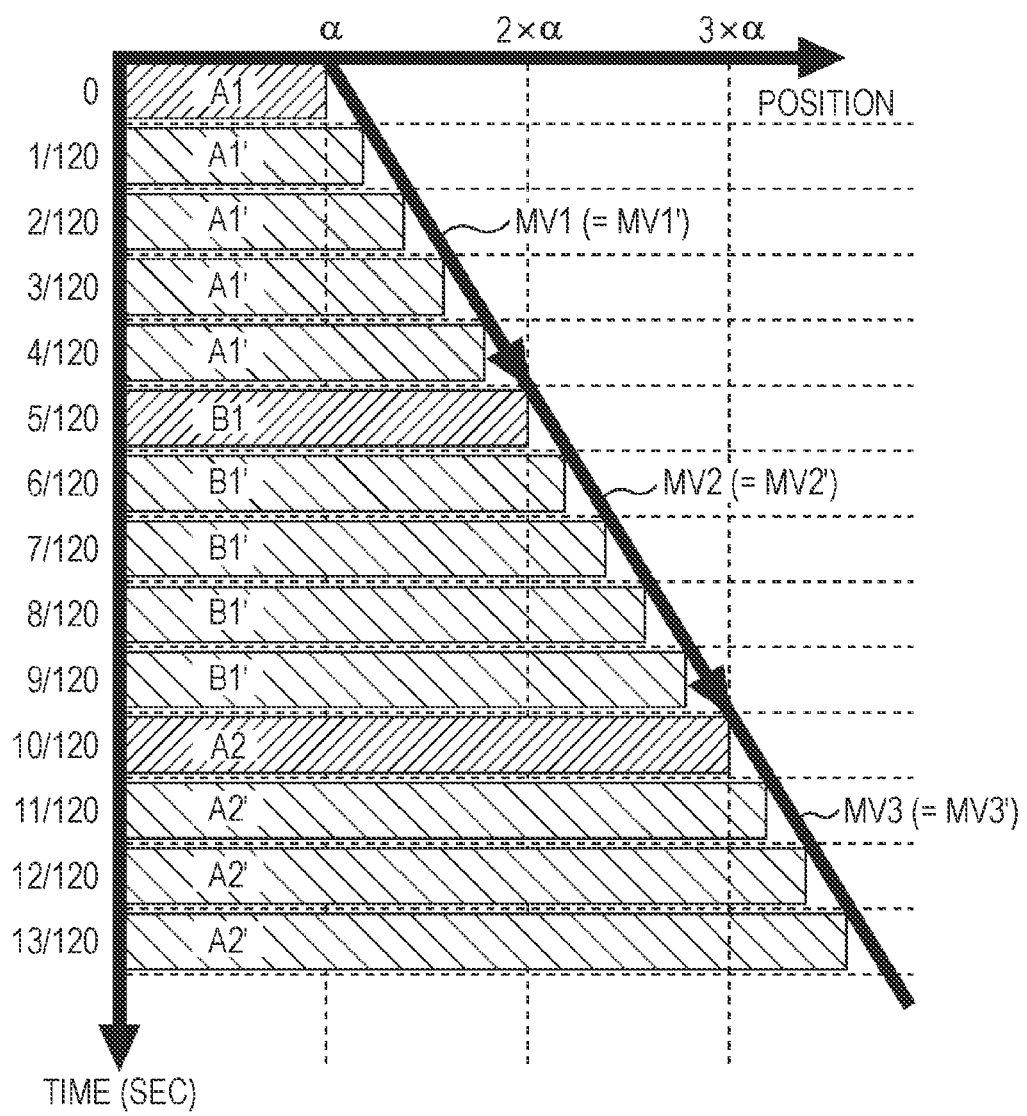
FIG. 5 is a timing chart illustrating a movement of the object relative to an output signal obtained after the image processing apparatus shown in FIG. 1 performs the frame compensation processing on the input signal shown in FIG. 3 in a case where all the motion vectors obtained after the conversion processing become equal to motion vectors which have not yet been subjected to the conversion processing when a room is lit up, for example.

For example, first to fourth frames A1', first to fourth frames B1', and first to fourth frames A2' may be inserted after the frames A1, B1, and A2, respectively, so that the object (represented by rectangular regions in FIG. 5) moves to the right in accordance with the motion vectors MV1, MV2, and MV3 as shown in FIG. 5, whereby the 120-Hz output signal T1 is generated.

In this case, when a time point in which the frame A1 is displayed is set to "0" and a position $\alpha$ [pix] of the object is set as a reference position, a video image corresponding to the output signal T1 is displayed such that the object moves as follows.

In the first frame A1' which is inserted immediately after the frame A1 and which is displayed at a time point of 1/120 [sec], the object moves by MV1 (=$\alpha$) [pix/(5/120) sec]×1/120 [sec]. In the second frame A1' which is inserted immediately after the first frame A1' and which is displayed at a time point of 2/120 [sec], the object moves by MV1 (=$\alpha$) [pix/(5/120) sec]×2/120 [sec]. In the third frame A1' which is inserted immediately after the second frame A1' and which is displayed at a time point of 3/120 [sec], the object moves by MV1 (=$\alpha$) [pix/(5/120) sec]×3/120 [sec]. In the fourth frame A1' which is inserted immediately after the third frame A1' and which is displayed at a time point of 4/120 [sec], the object moves by MV1 (=$\alpha$) [pix/(5/120) sec]×4/120 [sec].

Then, the frame B1 is displayed at a time point of 5/120 [sec]. The position of the object in the frame B1 is moved to the right from the reference position of the object in the frame A1 by $\alpha$ [pix]. Specifically, the object moves to the right by MV1 (=$\alpha$) [pix/(5/120)sec]×1/120 [sec] from the position of the object in the fourth frame A1' which is displayed in the time point of 4/120 [sec]. This means that an amount of movement of the object from the time point of 4/120 [sec] to a time point of 5/120 [sec] is equal to an amount of previous movement.

Thereafter, the inserted first to fourth frames B1', the frame A2, and the inserted first to fourth frames A2' are successively displayed with a time interval of 1/120 [sec]. Similarly, in these frames, the object moves to the right at constant speed. As a result, a highly-visible judder is not generated.

However, the realistic sensation unique to movies is generated due to a judder generated to some extent. Therefore, there arises the problem that when the user views such a video image which does not include the judder in an environment as dark as general movie theaters, the realistic sensation unique to movies is deteriorated.

In other words, since the human eyes have the eye-following characteristic, when judders of identical degrees are generated in a video image in an environment as dark as general movie theaters and in a video image in an environment brighter than the general movie theaters, the video image shown in the environment as dark as general movie theaters is recognized as a proper video image having realistic sensation similar to that in the movie theaters whereas the video image shown in the environment brighter than the general movie theater is recognized as a video image including a highly-visible judder.

Therefore, in order to reduce a highly-visible judder without deteriorating the realistic sensation similar to that in general movie theaters, that is, without deteriorating excellent characteristics of the movie source, the degree of generation of the judder should be appropriately changed in accordance with brightness in the user environment. This change is realized by changing the motion vector MV in accordance with the brightness, which will be described hereinafter. An amount of the change of the motion vector MV in accordance with the brightness corresponds to the gain G calculated using the gain calculation unit 14 in FIG. 1.

Figure 6:
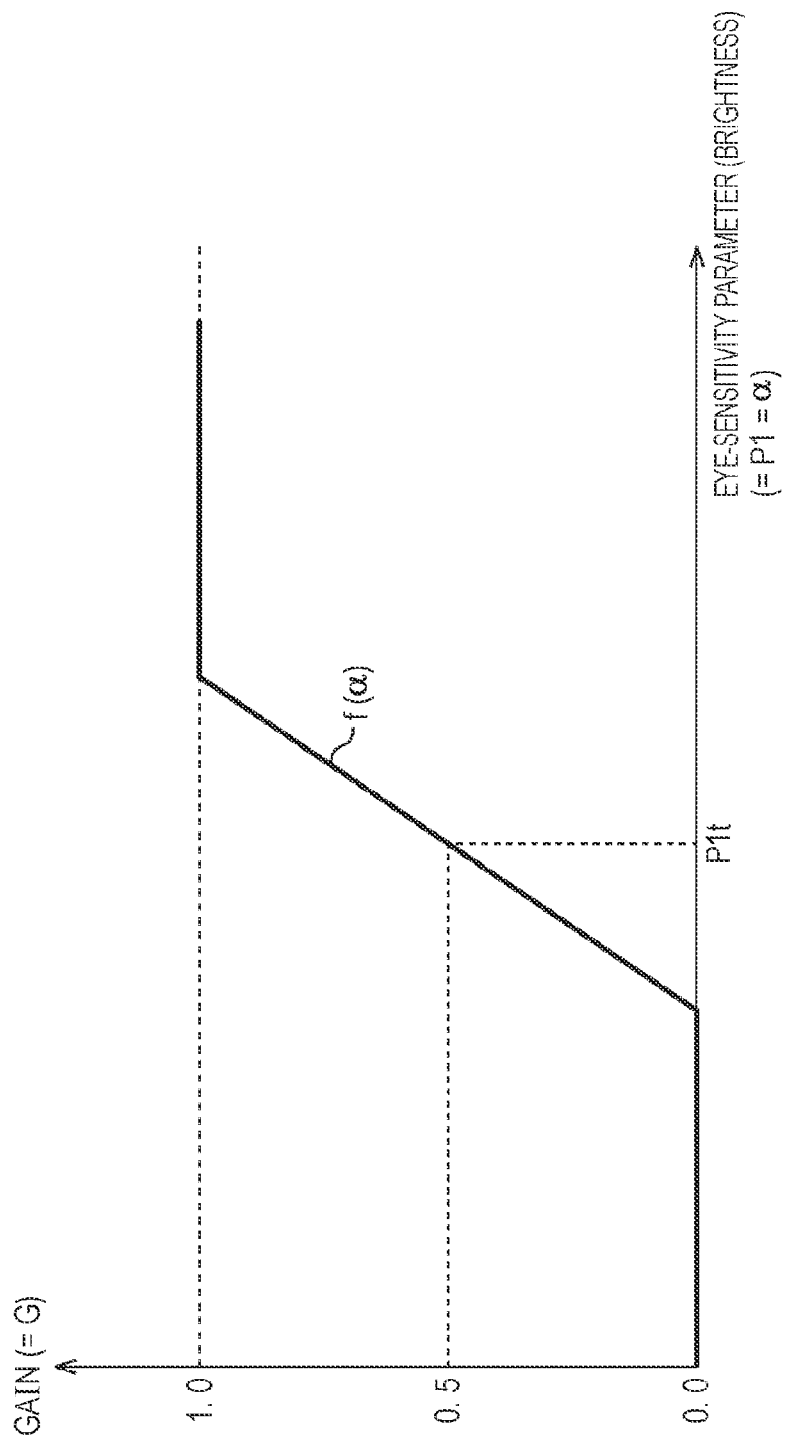
FIG. 6 is a diagram illustrating an example of a function stored in a gain calculation unit of FIG. 1.

The gain calculation unit 14 stores a function $f(\alpha)$ shown in FIG. 6, for example. The function $f(\alpha)$ is an example obtained when it is assumed that the eye-following characteristic is based on the proportional relationship between the eye sensibility and the brightness. In this example, the gain calculation unit 14 assigns the brightness P1 detected using the brightness detector 15 to the function $f(\alpha)$ as an input value $\alpha$ serving as a parameter of the eye sensibility, and supplies an output value $f(\alpha)$ thereof to the motion vector conversion unit 12 as the gain G.

The gain G obtained as described above is used to appropriately generate a judder suitable for the eye-following characteristic of the user (provided that the eye sensibility is in proportion to the brightness) under brightness of the user environment at the time. That is, the function $f(\alpha)$ is not limited to the example of FIG. 6, and a function of a curve in accordance with an actual eye-following characteristic is preferably employed.

The gain G is supplied to the motion vector conversion unit 12. Then, the motion vector conversion unit 12 converts the motion vector MV into the motion vector G×MV, and supplies the motion vector G×MV to the frame compensation unit 13.

Figure 7:
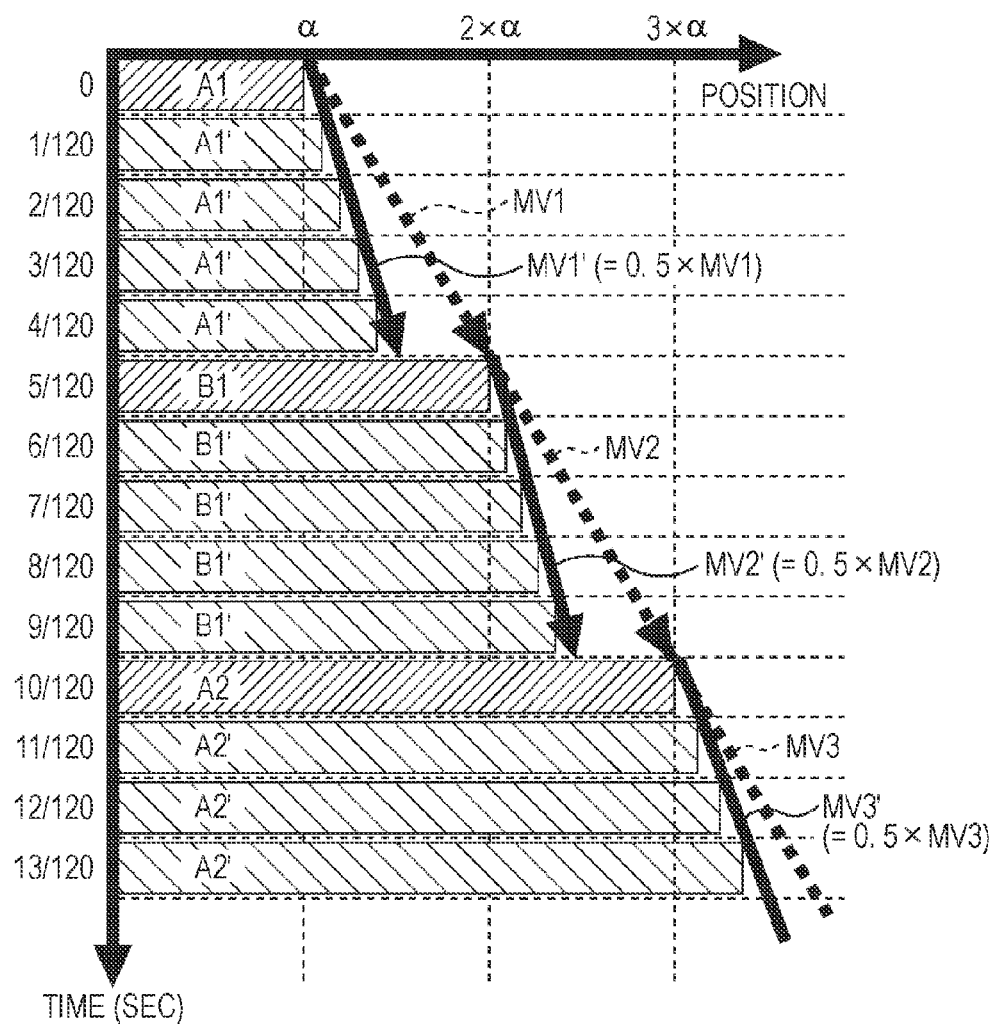
FIG. 7 is a timing chart illustrating a movement of the object relative to an output signal obtained after the image processing apparatus shown in FIG. 1 performs the frame compensation processing on the input signal shown in FIG. 3 in a case where all the motion vectors corresponds to amounts of movements obtained after the conversion processing become half the motion vectors which have not yet been subjected to the conversion processing when a room environment is changed so as to have a brightness in a middle of a range between brightness in the case of FIG. 4 and brightness in the case of FIG. 5, for example.

Accordingly, the frame compensation unit 13 performs the frame compensation processing as shown in FIG. 7 so as to generate 120-Hz image data which generates a judder suitable for the brightness at the time as the output signal T1.

Specifically, FIG. 7 shows an example in a case where the brightness P1 detected using the brightness detector 15 is determined to be brightness P1$t$ shown in FIG. 6. When the brightness P1 corresponds to the brightness P1$t$, a gain G of 0.5 is obtained using the gain calculation unit 14 and is supplied to the motion vector conversion unit 12. Then, the motion vector conversion unit 12 converts the motion vector MV1 into a motion vector MV1' (=0.5×MV1), the motion vector MV2 into a motion vector MV2' (=0.5×MV2), and the motion vector MV3 into a motion vector MV3' (=0.5×MV3), and successively supplies the motion vectors MV1', MV2', and MV3' to the frame compensation unit 13. The frame compensation unit 13 performs the following frame compensation processing.

As shown in FIG. 7, the frame compensation unit 13 inserts first to fourth frames A1', first to fourth frames B1', and first to fourth frames A2' after the frames A1, B1, and A2, respectively, so that the object (represented by rectangular regions shown in FIG. 7) moves in accordance with the converted motion vectors MV1', MV2', and MV3', whereby a 120-Hz output signal T1 is generated.

Specifically, when a time point in which the frame A1 is displayed is set to "0" and a position $\alpha$ [pix] of the object is set as a reference position, a video image corresponding to the output signal T1 is displayed such that the object moves as follows.

In the first frame A1' which is inserted immediately after the frame A1 and which is displayed at a time point of 1/120 [sec], the object moves by MV1' (=0.5×MV1=0.5×$\alpha$) [pix/(5/120) sec]×1/120 [sec]. In the second frame A1' which is inserted immediately after the first frame A1' and which is displayed at a time point of 2/120 [sec], the object moves by MV1' (=0.5×MV1=0.5×$\alpha$) [pix/(5/120) sec]×2/120 [sec]. In the third frame A1' which is inserted immediately after the second frame A1' and which is displayed at a time point of 3/120 [sec], the object moves by MV1' (=0.5×MV1=0.5×$\alpha$) [pix/(5/120) sec]×3/120 [sec]. In the fourth frame A1' which is inserted immediately after the third frame A1' and which is displayed at a time point of 4/120 [sec], the object moves by MV1' (=0.5×MV1=0.5×$\alpha$) [pix/(5/120) sec]×4/120 [sec].

Then, the frame B1 is displayed at a time point of 5/120 [sec]. The position of the object in the frame B1 is moved from the reference position of the object in the frame A1 by $\alpha$ [pix]. That is, the object moves by $\alpha$−MV1' (=0.5×MV1=0.5×$\alpha$) [pix/(5/120)sec]×4/120 [sec]=(3/5)×$\alpha$ [pix] from the position of the object in the fourth frame A1' which is displayed in the time point of 4/120 [sec].

The object moves by (1/10)×$\alpha$ [pix] every 1/120 [sec] in a range from the time point of 1/120 [sec] to the time point of 4/120 [sec]. That is, the object moves at constant speed. However, from the time point of 4/120 [sec] to the time point of 5/120 [sec], the object moves by (3/5)×$\alpha$ [pix]. Accordingly, an amount of movement increases and a judder is generated. Note that the amount of the movement is reduced to half the amount of the movement shown in FIG. 4 (that is, similar to the gain G reduced to half thereof), and therefore, a degree of generation of the judder is reduced. Specifically, in the brightness P1$t$ detected using the brightness detector 15, a judder suitable for the eye-following characteristic of the user is generated. In other words, a judder enough to realize the realistic sensation unique to movies and which is not highly visible is generated.

Thereafter, the object is basically displayed similarly to the movement of the object described above. That is, the object moves by (1/10)×$\alpha$ [pix] every 1/120 [sec] in a range from the time point of 5/120 [sec] to a time point of 9/120 [sec] at constant speed. Then, the object moves by (3/5)×$\alpha$ [pix] from the time point of 9/120 [sec] to the time point of 10/120 [sec]. Furthermore, the object moves by (1/10)×$\alpha$ [pix] every 1/120 [sec] in a range from the time point of 10/120 [sec] to a time point of 14/120 [sec]. Then, the object moves by (3/5)×$\alpha$ [pix] from the time point of 14/120 [sec] to a time point of 15/120 [sec]. This movement is repeatedly performed thereafter.

Although not shown, when the brightness P1 detected using the brightness detector 15 is changed, the gain G is changed in accordance with the change of the brightness P1. Therefore, an amount of movement of the object and a degree of generation of a judder are changed by an amount of change of the gain G.

In other words, when the brightness P1 detected using the brightness detector 15 becomes equal to or smaller than predetermined brightness, since a room turns dark, for example, the gain G becomes zero as shown in FIG. 6. Therefore, the motion vector G×MV obtained through conversion performed using the motion vector conversion unit 12 becomes zero. In this case, the output signal T1 generated through the frame compensation processing performed using the frame compensation unit 13 corresponds to the signal shown in FIG. 4.

On the other hand, when the brightness P1 detected using the brightness detector 15 becomes equal to or larger than predetermined brightness, since a room is lit up, for example, the gain G of 1 is obtained as shown in FIG. 6. Therefore, the motion vector G×MV obtained through the conversion performed using the motion vector conversion unit 12 corresponds to the motion vector MV which has not yet been subjected to the conversion. In this case, the output signal T1 generated through the frame compensation processing performed using the frame compensation unit 13 becomes equal to the signal shown in FIG. 5.

As described above, a judder suitable for the brightness P1 detected using the brightness detector 15 is generated. That is, in the brightness P1, a judder enough to realize the realistic sensation unique to movies and which is not highly visible is generated.

Note that a degree of the judder enough to realize the realistic sensation unique to movies and which is not highly visible is subjectively determined by the user. Therefore, the user correction unit 16 is provided in the example shown in FIG. 1 so that desired judders are generated for individual users. Specifically, the user freely changes the correction amount ΔG supplied from the user correction unit 16 to the gain calculation unit 14. Accordingly, the gain G is changed in accordance with the correction amount ΔG desired by the user. Consequently, a degree of generation of a judder is freely controlled by the user.

The operation of the image processing apparatus shown in FIG. 1 in the case where the film is supplied as the input signal T0 has been described above.

The operation of the image processing apparatus shown in FIG. 1 in the case where the film which has been subjected to the 2-3 pull down processing is supplied as the input signal T0 will now be described hereinafter with reference to FIGS. 8 to 11.

Figure 8:
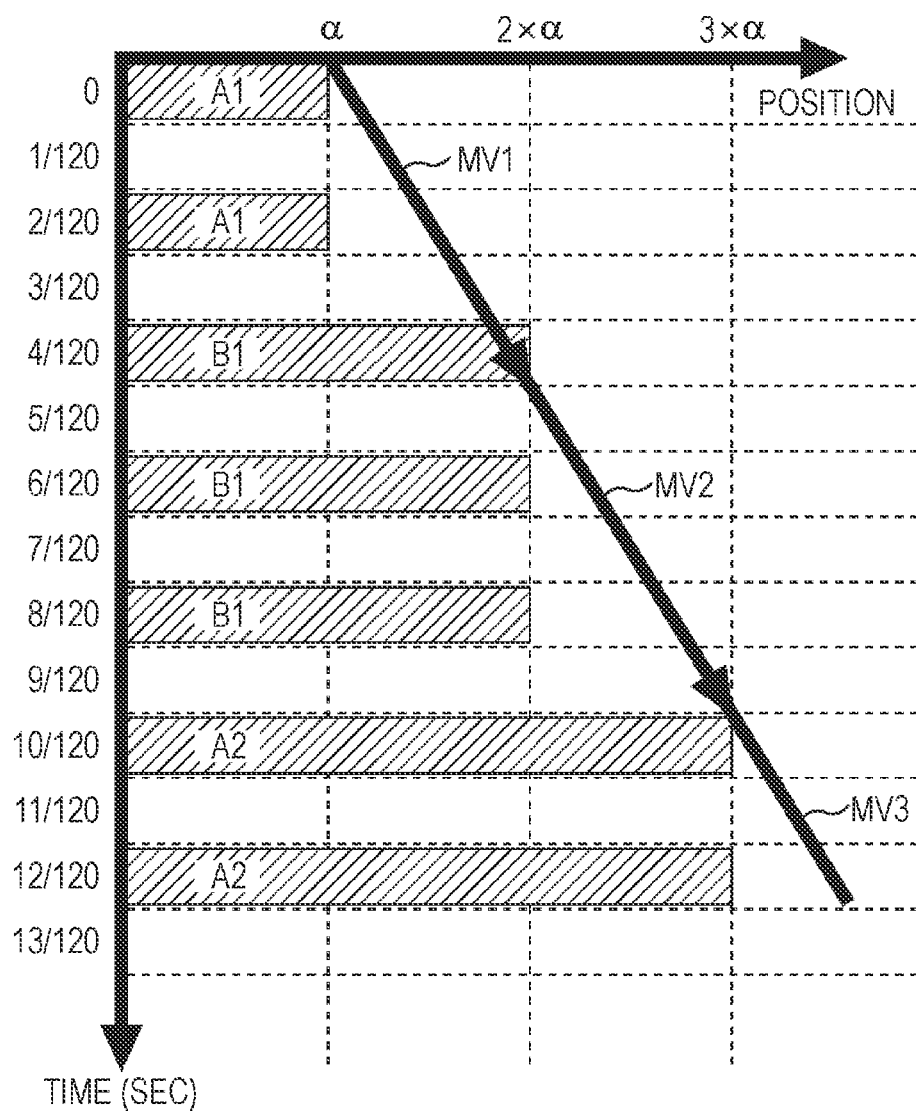
FIG. 8 is a timing chart illustrating a movement of the object in the film represented by an input signal which has been subjected to the 2-3 pull down processing.

FIG. 8 is a timing chart illustrating a movement of an object in a film which has been subjected to the 2-3 pull down processing represented by the input signal T0.

Figure 9:
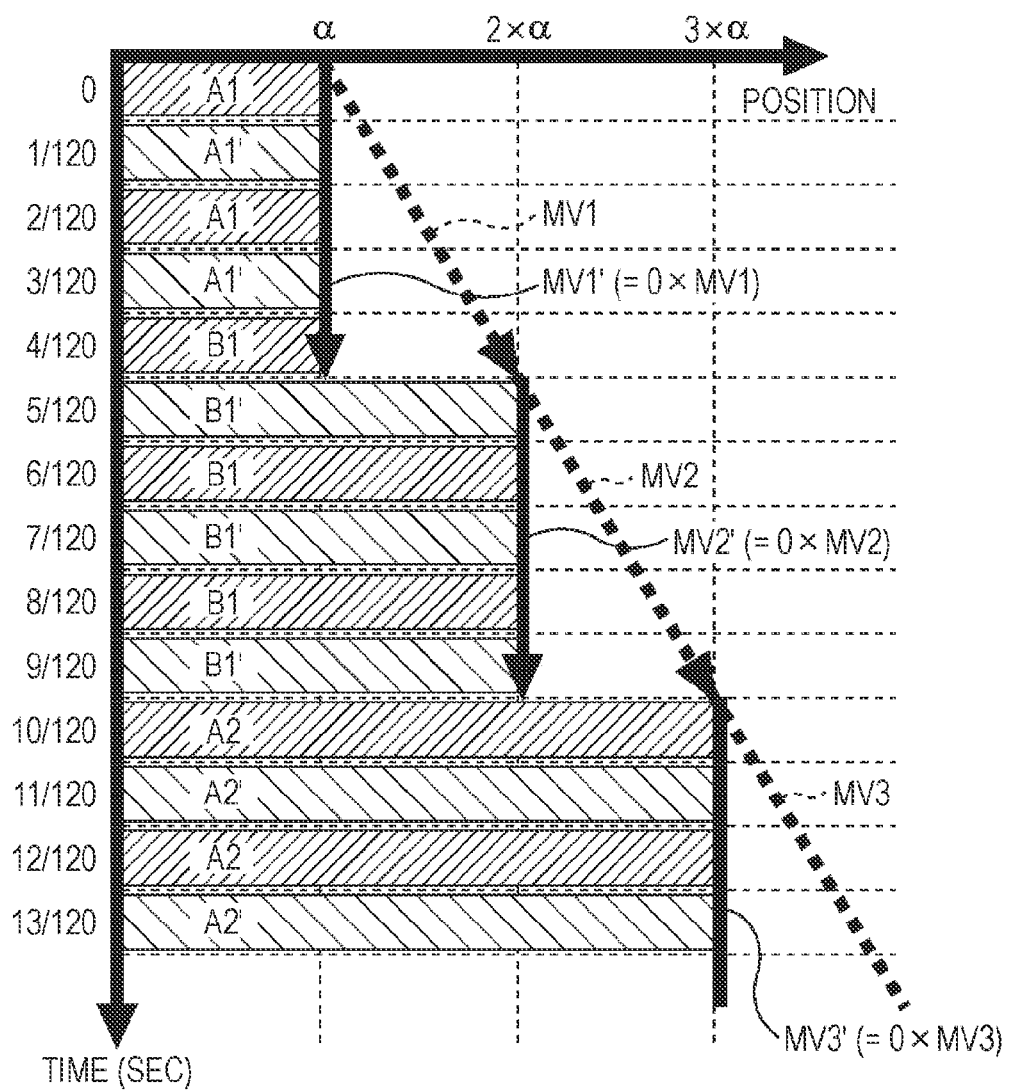
FIG. 9 is a timing chart illustrating a movement of the object relative to an output signal obtained after the image processing apparatus shown in FIG. 1 performs frame compensation processing on the input signal shown in FIG. 8 in a case where all motion vectors obtained after conversion processing become 0 when a room turns dark, for example.

FIG. 9 is a timing chart illustrating a movement of the object relative to the output signal T1 obtained after the frame compensation unit 13 performs frame compensation processing in a case where all the motion vectors MV1', MV2', and MV3' obtained after conversion processing become 0, that is, in a case where the gain G becomes 0 when a room turns dark, for example.

Figure 10:
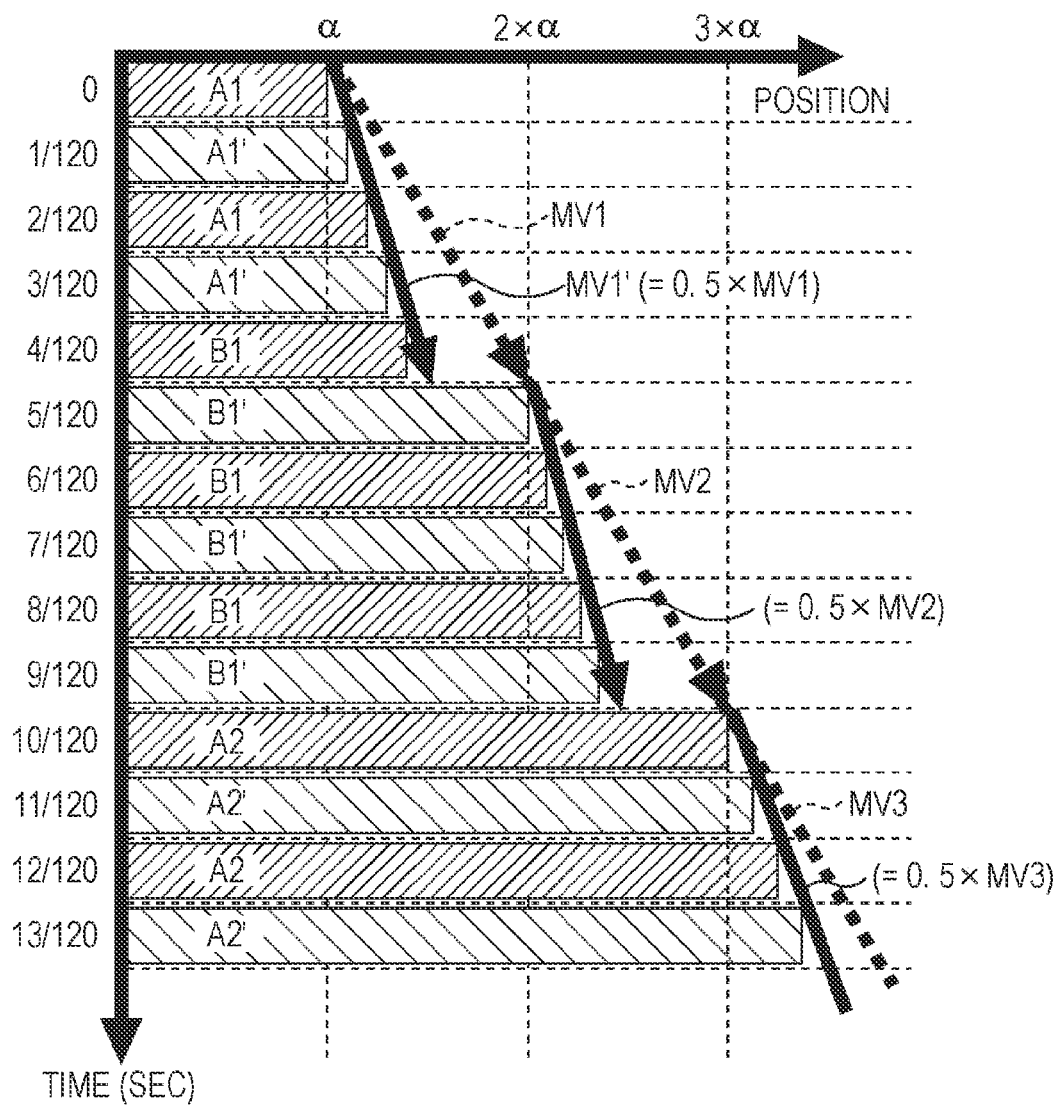
FIG. 10 is a timing chart illustrating a movement of the object relative to an output signal obtained after the image processing apparatus shown in FIG. 1 performs the frame compensation processing on the input signal shown in FIG. 8 in a case where all the motion vectors obtained after the conversion processing become half the motion vectors which have not yet been subjected to the conversion processing when a room environment is changed so as to have a brightness in a middle of a range between the brightness in the case of FIG. 4 and the brightness in the case of FIG. 5, for example.

FIG. 10 is a timing chart illustrating a movement of the object relative to the output signal T1 obtained after the frame compensation unit 13 performs the frame compensation processing in a case where all the motion vectors MV1', MV2', and MV3' obtained after the conversion processing become half the motion vectors which have not yet been subjected to the conversion processing, that is, in a case where the brightness P1t is detected using the brightness detector 15 and the gain G becomes 0.5.

Figure 11:
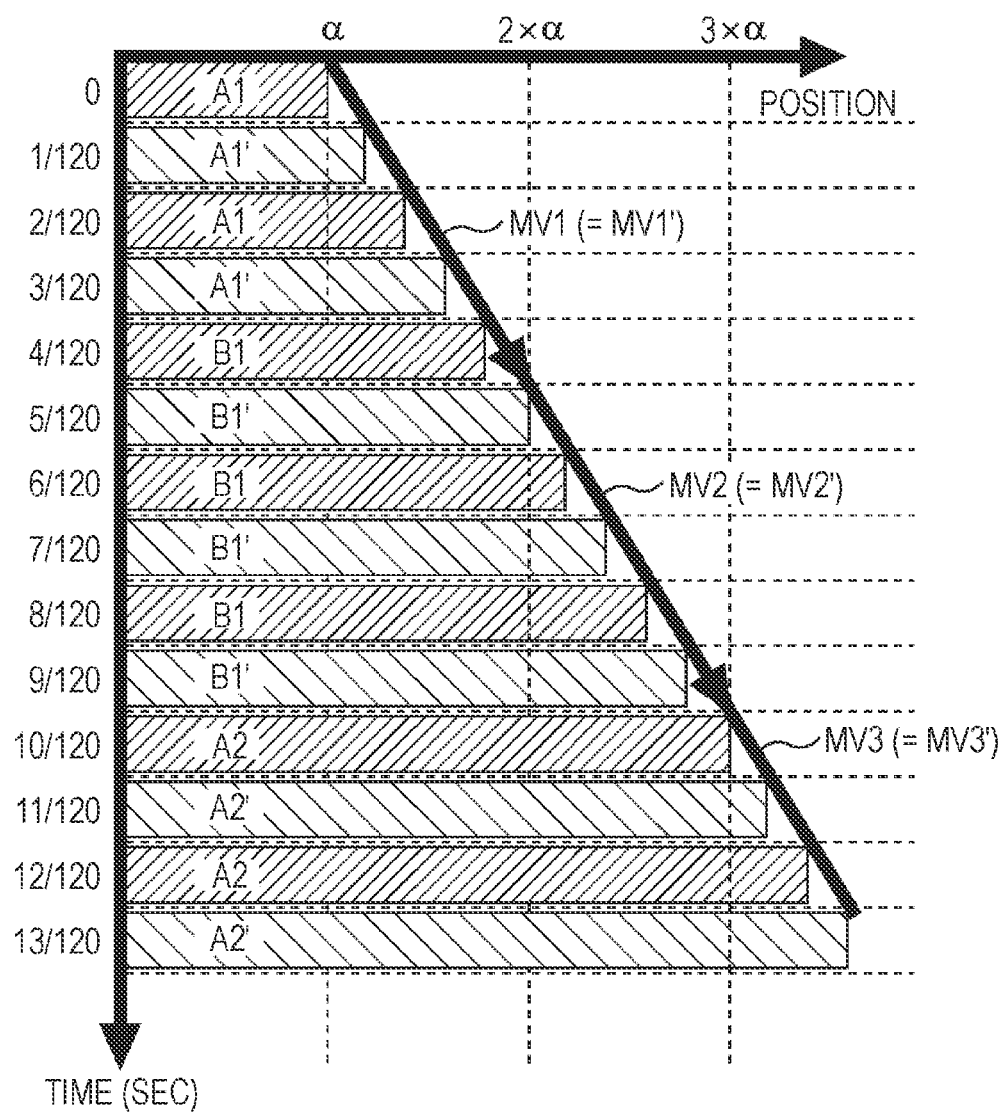
FIG. 11 is a timing chart illustrating a movement of the object relative to an output signal obtained after the image processing apparatus shown in FIG. 1 performs the frame compensation processing on the input signal shown in FIG. 8 in a case where all the motion vectors obtained after the conversion processing become equal to motion vectors which have not yet been subjected to the conversion processing when a room is lit up, for example.

FIG. 11 is a timing chart illustrating a movement of the object relative to the output signal T1 obtained after frame compensation unit 13 performs the frame compensation processing in a case where all the motion vectors MV1', MV2', and MV3' obtained after the conversion processing become equal to the motion vectors which have not yet been subjected to the conversion processing, that is, the gain G becomes 1 when a room is lit up, for example.

When FIGS. 8 to 11 are compared with FIGS. 3, 4, 7, and 5, the following fact becomes apparent. The operation of the image processing apparatus shown in FIG. 1 in the case where the film which has been subjected to the 2-3 pull down processing is supplied as the input signal T0 is "basically" the same as the operation of the image processing apparatus in the case where the film is supplied as the input signal T0 which is described with reference to FIGS. 3 to 5 and FIG. 7. They are "basically" the same except for the fact that since a frame period of the input signal T0 which has not yet been subjected to the frame conversion is slightly different between the two cases, the number of frames to be inserted is slightly different between the two cases, for example.

As described above, the image processing apparatus shown in FIG. 1 appropriately controls an amount of generation of a judder in accordance with brightness of a user environment (a room, for example) where the user actually views a movie source, that is, in accordance with an eye-following characteristic of human eyes by performing the operation described above. Consequently, excellent characteristics of the movie source are brought out.

Note that a series of the processes described above (or a part of the processes) may be executed by hardware or software.

Figure 12:
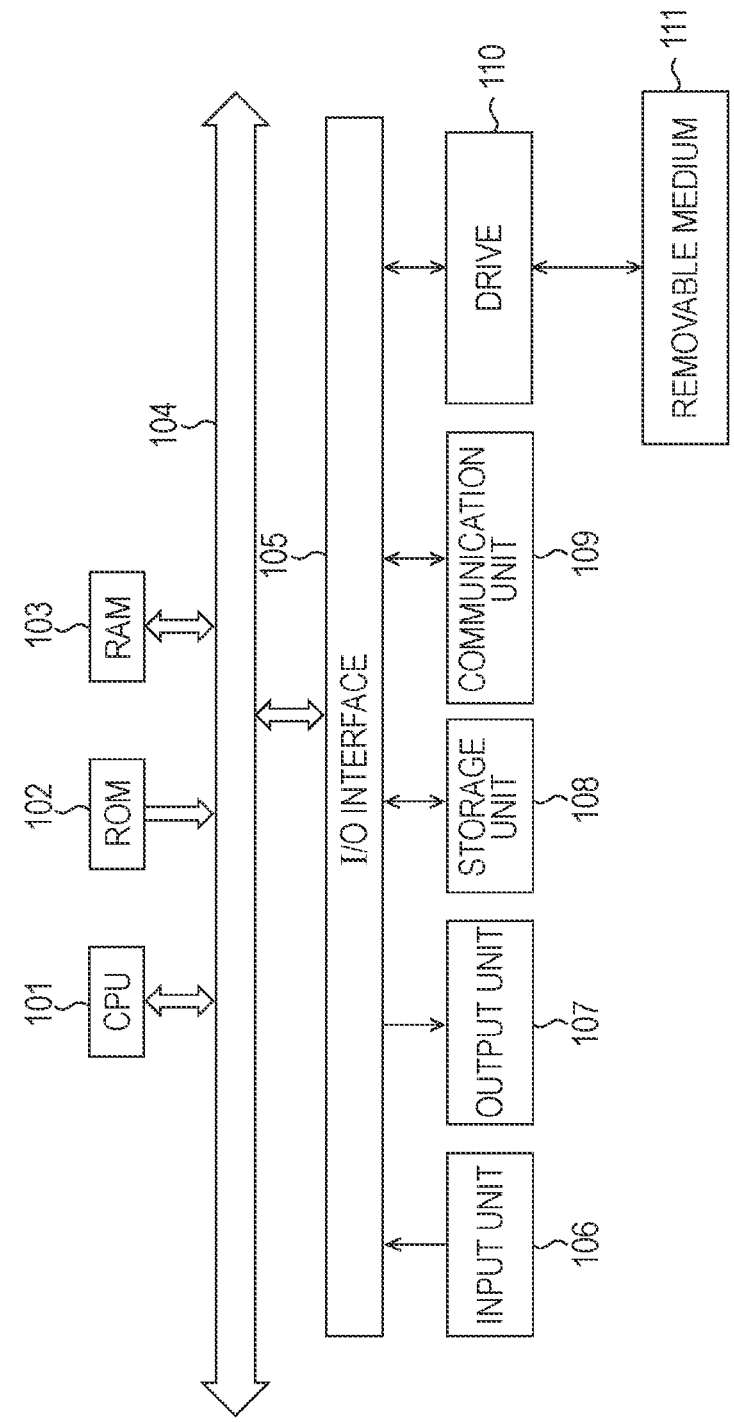
FIG. 12 is a block diagram illustrating an example of an entire or a part of a hardware configuration of the image processing apparatus according to an embodiment of the present invention.

In this case, the entire image processing apparatus of FIG. 1 or a part of the image processing apparatus of FIG. 1 may be constituted by a computer shown in FIG. 12, for example.

In FIG. 12, a CPU (Central Processing Unit) 101 performs various processes in accordance with a program recorded in a ROM (Read Only Memory) 102 or a program loaded from a storage unit 108 into a RAM (Random Access Memory) 103. The RAM 103 also stores therein data which is used when the CPU 101 performs the various processes.

The CPU 101, the ROM 102, and the RAM 103 are connected with one another through a bus 104. The bus 104 is further connected to an input/output interface 105.

The input/output interface 105 is connected to an input unit 106 including a keyboard and a mouse, an output unit 107 including a display, the storage unit 108 including a hard disk, and a communication unit 109 including a modem and a terminal adapter. The communication unit 109 communicates with other apparatuses through a network including the Internet.

The input/output interface 105 is further connected to a drive 110. A removable medium 111 including a magnetic disk, an optical disc, a magneto-optical disc, and a semiconductor memory is appropriately inserted into the drive 110. A computer program read from the removable medium 111 is appropriately installed in the storage unit 108.

When the series of the processes are performed using software, a program included in the software is installed into a computer incorporated in a dedicated hardware or into a general personal computer capable of performing various functions by installing various programs, for example, through a network or a recording medium.

Such a recording medium including the program is constituted by the removable medium (package medium) 111 such as a magnetic disk (including a floppy disk), an optical disc (including a CD-ROM (Compact Disk-Read Only Memory), a DVD (Digital Versatile Disk)), a magneto-optical disc (including an MD (Mini-Disk)) or a semiconductor memory, in which the program is recorded, which is provided separately from the apparatus body, and which is distributed so as to supply the program to the user. Alternatively, the recording medium including the program is constituted by the ROM 102 including the program recorded therein to be supplied to the user in a state in which the ROM is incorporated in the apparatus body, or a hard disk included in the storage unit 108.

Note that in this specification, steps of describing the program in the recording medium may be performed in a time series manner in an order of the steps, or may be performed in parallel or individually.

As described above, in this specification, a system means the entire apparatus including a plurality of processing devices and processing units.

In the foregoing examples, the movement amount MV indicates an amount of movement in a certain direction, that is, in a horizontal direction in the frame, for example, for simplicity. However, it is apparent that the movement amount MV may indicate an amount of movement in other directions. In this case, that is, in a case where the movement amount MV indicates an amount of movement in a direction other than the horizontal direction, since the image processing apparatus sets the movement amount as a vector, processes basically similar to the various processes described above are executed.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for processing an input moving image including a plurality of access units arranged every first period, the image processing apparatus comprising:
   motion vector calculation means for calculating a motion vector of an object included in the input moving image every second period;
   motion vector conversion means for converting the motion vector by multiplying the motion vector calculated using the motion vector calculation means by a predetermined gain;
   frame compensation means for generating an output moving image including a plurality of access units arranged every third period; and
   gain calculation means for calculating the predetermined gain in accordance with a brightness in a user environment where a user views an output moving image and supplying the predetermined gain to the motion vector conversion means.

2. The image processing apparatus according to claim 1, further comprising:
   frame compensation means for generating the output moving image including a plurality of access units arranged every third period by performing frame compensation processing of converting or compensating for the access units on the input moving image so that the object moves in accordance with the motion vector which has been subjected to the conversion performed using the motion vector conversion means.

3. The image processing apparatus according to claim 1, further comprising:
   brightness detection means for detecting the brightness in the user environment,
   wherein the gain calculation means calculates the predetermined gain in accordance with the brightness detected using the brightness detection means.

4. The image processing apparatus according to claim 1, further comprising:
   correction means for correcting the predetermined gain calculated using the gain calculation means in accordance with an instruction issued by the user.

5. An image processing method, implemented by a hardware processor, for processing an input moving image including a plurality of access units arranged every first period, the image processing method comprising the steps of:
   calculating, by the processor, a motion vector of an object included in the input moving image every second period;
   converting the motion vector by multiplying the calculated motion vector by a predetermined gain;
   generating an output moving image, for frame compensation, including a plurality of access units arranged every third period; and
   calculating, by the processor, the predetermined gain in accordance with a brightness in a user environment where a user views an output moving image and supplying the predetermined gain to perform said converting.

6. A non-transitory computer readable medium encoded with a program which causes a computer to execute a method for processing an input moving image including a plurality of access units arranged every first period, the method comprising the steps of:
   calculating a motion vector of an object included in the input moving image every second period;
   converting the motion vector by multiplying the calculated motion vector by a predetermined gain;
   generating an output moving image, for frame compensation, including a plurality of access units arranged every third period; and
   calculation the predetermined gain in accordance with a brightness in a user environment where a user views an output moving image and supplying the predetermined gain to perform said converting.

7. An image processing apparatus for processing an input moving image including a plurality of access units arranged every first period, the image processing apparatus comprising:
   a processor device and a memory communicatively connected with the processor device;
   a motion vector calculation unit configured to calculate a motion vector of an object included in the input moving image every second period;
   a motion vector conversion unit configured to convert the motion vector by multiplying the motion vector calculated using the motion vector calculation unit by a predetermined gain;
   a frame compensation unit for generating an output moving image including a plurality of access units arranged every third period; and
   a gain calculation unit configured to calculate the predetermined gain in accordance with a brightness in a user environment where a user views an output moving image and supply the predetermined gain to the motion vector conversion unit.

* * * * *